United States Patent
Mulukutla et al.

(10) Patent No.: US 9,411,870 B2
(45) Date of Patent: Aug. 9, 2016

(54) SYSTEM AND METHOD FOR LOCATION AWARE FINE-GRAINED MULTI-CHANNEL SYNCHRONIZATION OF MOBILE REPOSITORIES ALONG WITH AGGREGATE ANALYTIC COMPUTATION

(71) Applicants: Ramkartik Mulukutla, Santa Clara, CA (US); Xiaojun Lu, Santa Clara (CA)

(72) Inventors: Ramkartik Mulukutla, Santa Clara, CA (US); Xiaojun Lu, Santa Clara (CA)

(73) Assignee: iData Crunch, San Jose, CA (US)

( * ) Notice: Subject to any disclaimer, the term of this patent is extended or adjusted under 35 U.S.C. 154(b) by 316 days.

(21) Appl. No.: 14/262,399

(22) Filed: Apr. 25, 2014

(65) Prior Publication Data
US 2014/0337289 A1   Nov. 13, 2014

Related U.S. Application Data

(60) Provisional application No. 61/821,054, filed on May 8, 2013.

(51) Int. Cl.
*G06F 17/30* (2006.01)

(52) U.S. Cl.
CPC ............... *G06F 17/30578* (2013.01)

(58) Field of Classification Search
CPC ............ G06F 17/30575; G06F 17/30578; G06F 17/30581; G06F 17/30283
See application file for complete search history.

(56) References Cited

U.S. PATENT DOCUMENTS

| | | | | |
|---|---|---|---|---|
| 2006/0271600 A1* | 11/2006 | Goh | ................ | G06Q 10/06 |
| 2007/0067349 A1* | 3/2007 | Jhaveri | ............ | G06F 17/30206 |
| 2013/0262385 A1* | 10/2013 | Kumarasamy | .... | G06F 17/30082 707/634 |
| 2013/0332505 A1* | 12/2013 | Karandikar | ......... | H04L 67/1002 709/202 |

OTHER PUBLICATIONS

Couchbase, Data routing with "channels", accessed May 2, 2016 at http://developer.couchbase.com/documentation/mobile/current/develop/guides/sync-gateway/channels/index.html.*

* cited by examiner

*Primary Examiner* — William Spieler
(74) *Attorney, Agent, or Firm* — Tran & Associates (57) ABSTRACT

System and method for location aware fine-grained multi-channel synchronization of mobile repositories along with aggregate analytic computation is disclosed. The System is able to improve upon existing systems by allowing for custom policies on synchronization to be stored and applied when data synchronization happens, these policies are persisted in the Sync Data Repository and applied during sync. The System is able to improve upon existing systems by allowing for persistent marking of states of the sync repository as Sync Points. This way data can be pulled from a sync point. The System is able to improve upon existing systems by having a computation framework that is able to push down aggregate analytics to user, these analytics are computed by analyzing data in the Sync Channel along various dimensions such as temporal, geo.

20 Claims, 6 Drawing Sheets

SYSTEM AND METHOD FOR LOCATION AWARE FINE-GRAINED MULTI-CHANNEL SYNCHRONIZATION OF MOBILE REPOSITORIES ALONG WITH AGGREGATE ANALYTIC COMPUTATION

This application claims priority to Provisional Application Ser. No. 61/821,054, filed May 8, 2013, the content of which is incorporated by reference.

BACKGROUND

The present invention is related to mobile communication devices.

There is an enormous market for applications, also referred to herein as apps, running on cell phones, smart phones, and other computing devices. The growth of the mobile apps industry has been phenomenal due to, among other factors, the success of wireless devices such as iPhones, iPads, BlackBerrys, Android-based computing devices, Qualcomm's BREW, BMP and Snapdragon based devices. However, these devices and applications do not allow users to aggregate and share structured and unstructured information so that the data can be reconciled with other users.

SUMMARY

In one aspect, a system consists of a cloud based sync server system that is accessible over the Internet and services requests from a mobile client software. The server system in turn connects to an Information System (IS) such as a distributed database or a message bus. The server system translates and relays information to the mobile client repositories while following both the user setup synchronization policies and the Sync Channel administrator setup synchronization policies.

The Mobile client software runs on devices such as smart phones and tablets as well as desktops. The Mobile software connects to the server system and performs bi-directional synchronization of user data using advanced reconciliation policies. The mobile client carries a slice of the repository at any given time. The Mobile client can work offline with its slice of data and is designed to synchronize at user specified frequency along with a policy to synchronize upon request alone. The Mobile client software is specifically designed to efficiently display and manipulate significant amounts of data in small form factors, custom widgets are developed on device family platforms to accomplish this. One embodiment of this idea is a custom table widget that allows for update and display of both graphical and tabular data with gestures on one screen with pagination and sort, another embodiment is a custom time series graphical display widget that is paged horizontally.

Implementations of the above aspect can include one or more of the following. Users carry devices including mobile devices which contain repositories of structured and unstructured information such as expenses, inventory snapshots, orders placed, device activity logs, browsing meta data, free text notes, messages etc. Users want to share this data easily with others and make it possible for others to update this data that they own, further Users also want to gather aggregate information pertaining to users in a group of their choosing that will provide additional value to them—this invention allows them to do accomplish this. The system allows users to discover, subscribe to, publish and pull data from Sync Channel(s) that interest them. Sync Channel(s) are logical conduits for information exchange. The system allows user to share and reconcile their data with others. While subscribing to Sync Channel(s) the system lets users select policies for reconciliation of data published and received through the Sync Channel. These policies guide the system to update and synchronize the user's mobile repository with the Sync Channel. The system allows reconciliation process to be customized by the user as well as the Sync Channel administrator. The system creates additional value to users by pushing down aggregate metrics and data that are computed by the system to individual users that subscribe to Sync Channel(s).

Advantages over the existing systems may include one or more of the following:

- The system allows for multiple Sync Channel(s) to synchronize Users data.
- The system allows for both users and Sync Channel managers to setup reconciliation policies that govern how data is synchronized.
- The system allows for Sync Channel discovery and subscription process along various dimensions such as geo, temporal, user based, category based etc.
- The system allows for synchronization points to be setup by the Sync Channel administrator by geo, temporal, a combination of the two or any arbitrary marker.
- The system allows for push down intelligence from the Sync Channel to the devices. The aggregate data computation is customizable by the Sync Channel administrator.
- The System allows for custom policies on synchronization to be stored and applied during data synchronization, these policies are persisted in the Sync Data Repository and applied during sync. The System is able to improve upon existing systems by allowing for persistent marking of states of the sync repository as Sync Points. This way data can be pulled from a sync point. The System is able to provide a computation framework that is able to push down aggregate analytics to user, these analytics are computed by analyzing data in the Sync Channel along various dimensions such as temporal, geographic dimensions, for example.

DETAILED DESCRIPTION

Figure 1:
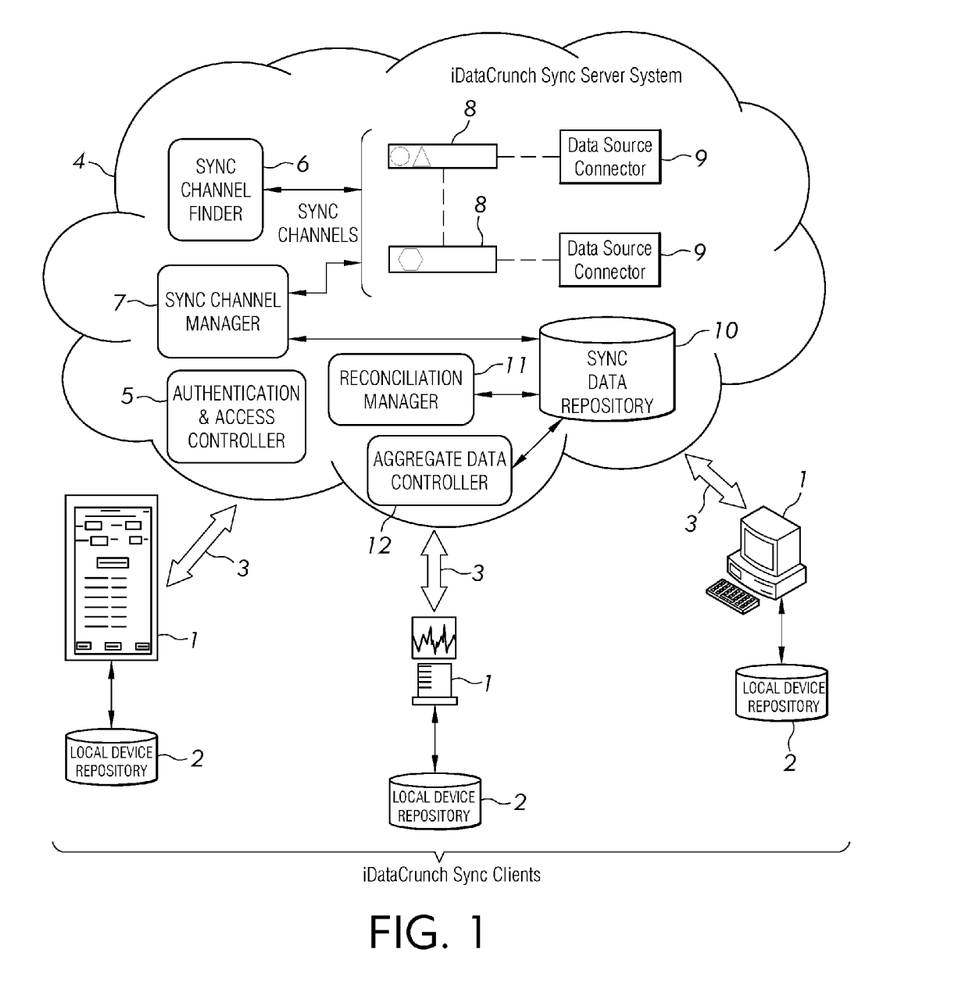
FIG. 1 shows an exemplary system for location aware fine-grained multi-channel synchronization of mobile repositories along with aggregate analytic computation.

FIG. 1 shows an exemplary system for location aware fine-grained multi-channel synchronization of mobile repositories along with aggregate analytic computation. With the system, users carry devices including mobile devices which contain repositories of structured and unstructured information such as expenses, inventory snapshots, orders placed, device activity logs, browsing meta data, free text notes, messages etc. Users want to share this data easily with others and make it possible for others to update the data that they own, further users also want to gather aggregate information pertaining to users in a group of their choosing that will provide additional value to them.—The system of FIG. 1 allows them to do accomplish this.

The relationships between the components shown in FIG. 1 are detailed next. A device such as a Computer or a Smart Phone (1) capable of data processing and having local device storage (2) and having the capability to connect to the internet (3) is used to download and install The Mobile Client software. The device connects to the server system using a Mobile Client software that uses the device's (1) internet connection (3) to connect to The Server system (4). An authentication and access control service (5) in the Server system receives requests from the client software, validates users credentials and forwards the user request to a Sync Channel Finder service (6) which helps the user to subscribe to an existing Sync Channel (8). Alternately the user is also given an option to create a new Sync Channel (8) using the Sync Channel Manager (7) service. While creating a new Sync Channel the user can specify access control policies, reconciliation policies available on that Sync Channel. Sync Channel(s) (8) receive structured and non-structured data such as images, emails, expenses, inventory numbers etc. from Sync Channel Data Sources using Data Source Connectors (9) on a period or on-demand basis. Data received from Sync Channel data sources is persisted to a Sync Repository (10) to ensure persistence of data and reliability. When user desires to sync data, a request goes out to the Sync Channel Manager (7) via the Authentication and the device accesses a controller (5) to perform sync. The Sync Channel Manager (7) then fetches relevant data from the Sync Data Repository (10) and calls Sync Channel Reconciliation Manager (11). Sync Channel Reconciliation Manager (11) processes information from the Sync Repository to gather the state of the Sync Channel and, together with Sync Channel Reconciliation policies as well as User specified policy for retrieval of data, performs reconciliation and synchronization. The Sync Channel Reconciliation Manager (11) based on the reconciliation policy setup, updates the sync data repository 10 as appropriate.

The system allows users to discover, subscribe to, publish and pull data from Sync Channel(s) that interest them. Sync Channel(s) are logical conduits for information exchange. The system allows the user to share and reconcile their data with others. While subscribing to Sync Channel(s) the system lets users select policies for reconciliation of data published and received through the Sync Channel. These policies guide the system to update and synchronize the user's mobile repository with the Sync Channel. The system allows reconciliation process to be customized by the user as well as the Sync Channel administrator. The system creates additional value to users by pushing down aggregate metrics and data that are computed by the system to individual users that subscribe to Sync Channel(s).

The system consists of a cloud based sync server system that is accessible over the Internet and services requests from the Mobile client software. The server system in turn connects to an Information System (IS) such as a distributed database or a message bus. The server system translates and relays information to the mobile client repositories while following both the user setup synchronization policies and the Sync Channel administrator setup synchronization policies. In this system, if the Authentication Controller 5 fails the authentication then a Deny-Access-to-Sync routine will be invoked and access to the system will be denied. If authentication is successful, Sync Channel Manager 7 will be invoked to fetch fine grained data from Sync Repository 10, if the fetch fails Repository Failure routine will be invoked. If data fetch is successful Reconciliation Manager 11 will be invoked to reconcile data and produce client slice of data, if this module fails Channel Error handling routine is invoked and a user receives an error notification, else, Reconciliation Manager commits data to the Sync Repository 10 and produces user device's (client) slice of the synced repository. If Sync Channel policy is setup to compute aggregate data then the Aggregate Data Controller is invoked to compute aggregate data add to the produced client slice of the repository. Finally the user device's slice of synced data is now returned to the user over the network connection 3.

The mobile client software is designed to run on devices such as smart phones and tablets as well as desktops. In one embodiment, a software called the iDataCrunch Mobile software connects to the server system and performs bi-directional synchronization of user data using advanced reconciliation policies. The mobile client carries a slice of the repository at any given time. The Mobile client can work offline with its slice of data and is designed to synchronize at user specified frequency along with a policy to synchronize upon request alone. The Mobile client software is specifically designed to efficiently display and manipulate significant amounts of data in small form factors, custom widgets are developed on device family platforms to accomplish this. One embodiment of this idea is a custom table widget that allows for update and display of both graphical and tabular data with gestures on one screen with pagination and sort, another embodiment is a custom time series graphical display widget that is paged horizontally.

Advanced security policies are enabled in the system to detect and cease unauthorized access to data, these include techniques such as SSL—secure socket layer, multi factor authentication, fraud classifiers and neural network algorithms to detect and stop unauthorized access.

Synchronization of data in this context means the user's data is updated by the Sync Channel as well as the user potentially updates others data. The data is writable based on policies. Many other data synchronization allow for read only data such as text content to be synchronized.

In contrast, existing mobile data synchronization systems do not provide users with ability to control how the synchronization of their data happens. The policies for synchronization followed by other systems implicitly without the user's knowledge lead to dissatisfactory synchronization of data and the User suffers loss of data quality. The instant mobile data synchronization mechanisms allow for users to synchronize their data to a pre-configured sync point. The dimensions of the sync point in this invention are either geo, temporal, a combination of the two or in other cases entirely arbitrary markers. The instant mobile data synchronization mechanisms allows for users to create custom Sync Channel(s) and invite other of their users to start synchronizing data, while setting up policies on how data will get updated. The instant mobile data synchronization mechanisms allow for users to simultaneously synchronize and reconcile their data to multiple Sync Channel(s). The instant mobile data synchronization mechanisms allow for subscription of push down aggregate data on a Sync Channel.

The System is designed to run on devices such as smart phones and tablets as well as laptop/desktop computers to store and synchronize data. Synchronization of data in this context means the user's data is updated by the Sync Channel as well as the user potentially updates others data. The data is writable based on policies. Many other data synchronization allow for read only data such as text content to be synchronized. The instant mobile data synchronization mechanisms allow for users with ability to control how the synchronization of their data happens. The policies for synchronization followed by other systems implicitly without the user's knowledge lead to dissatisfactory synchronization of data and the User suffers loss of data quality. The instant mobile data synchronization mechanisms allow users to synchronize their data to a pre-configured sync point. The dimensions of the sync point in this invention are either geo, temporal, a combination of the two or in other cases entirely arbitrary markers. Users can create custom Sync Channel(s) and invite other of their users to start synchronizing data, while setting up policies on how data will get updated. Users can simultaneously synchronize and reconcile their data to multiple Sync Channel(s). The instant mobile data synchronization mechanisms allow for subscription of push down aggregate data on a Sync Channel. The system allows for specific policies on synchronization that iDataCrunch system allows. Different from existing systems, the present system supports the notion of sync points. Existing systems do not allow for push down of aggregate metrics to individual sync users. The System improves upon existing systems by allowing for custom policies on synchronization to be stored and applied when data synchronization happens, these policies are persisted in the Sync Data Repository and applied during sync. The system includes allowing for persistent marking of states of the sync repository as Sync Points. This way data can be pulled from a sync point.

The System is able to improve upon existing systems by having a computation framework that is able to push down aggregate analytics to user, these analytics are computed by analyzing data in the Sync Channel along various dimensions such as temporal, geo. Also, it can produce Mobile software that manages expenses and synchronizes that data with other users. Mobile software can produce specific deals by analyzing data and aggregating data across users, while the Mobile Enterprise software helps people in an organization to share and update common set of data. The web portals lets users share data voluntarily and produce aggregate metrics and information of value to user.

One embodiment offers the following capability

1. Devices with computing power that can run iDataCrunch Client software. These include but are not limited to: Apple iOS devices, Android Devices, Blackberry devices, Windows Mobile devices, Laptop computers and Desktop computers. (Apple iOS, Android, Blackberry and Windows are trademarks owned by their companies).
2. Available local storage on device. This local storage is used to store the user's device view of the distributed repository
3. Device connection to the internet and The Server. Device is able to communicate with the Server using the internet connection using HTTP/HTTPS internet protocols.
4. The Server system. This system consists of series of services that together form the Server System. This server system is able to service requests coming from The Clients over the internet using HTTP/HTTPS to provide sync services. The server is accessible over the internet and has an web internet address.
5. Authentication and Access controller, is a service that controls access to the system, it makes sure that users have valid credentials and have the authorization setup on the Sync Channel(s) they are going to access.
6. Sync Channel Finder service that allows for users to discover Sync Channel(s) of interest along various dimensions.
7. Sync Channel Manager is a service that allows for creation, update and delete of Sync Channel(s). This service also manages all reconciliation policies available on a Sync Channel.
8. Sync Channel(s) that provide information. Sync Channel(s) are logical conduits for information exchange in the server system.
9. Data source connector that allows for data from external systems to be transferred to and from the Sync Channel.
10. Sync data repository is a master repository of all data carried across all Sync Channel(s).
11. Reconciliation manager is a service that applies reconciliation policies specified on Sync Channel(s) and serves up a reconciled slice of data for the user—device combination.
12. Aggregate data controller is a service that aggregates Sync Channel data and serves up computed aggregate metrics. This server also is able to push down custom metrics and promotions to user based on data analysis that the user agrees to.

In one embodiment, the system consists of an on-demand, Software-as-a-Service (Cloud service) based sync server that is accessible over the Internet and services requests from iDataCrunch Mobile client software. The server in turn connects to an Information System (IS) such as a distributed database or a message bus. The server system translates and relays information to the mobile client repositories while following both the user setup synchronization policies and the Sync Channel administrator policies.

The iDataCrunch Mobile client software embodiment is designed to run on devices such as smart phones and tablets as well as desktops. iDataCrunch Mobile software is designed to perform processing at high speed with high availability. iDataCrunch mobile client carries a slice of the repository at any given time. iDataCrunch Mobile client can work offline with its slice of data and is designed to synchronize at user specified frequency along with a policy to synchronize upon request alone. iDataCrunch Mobile client software is specifically designed to efficiently display and manipulate significant amounts of data in small form factors, custom widgets are developed on device family platforms to accomplish this. One embodiment of this idea is a custom table widget that allows for update and display of both graphical and tabular data with gestures on one screen with pagination and sort, another embodiment is a custom time series graphical display widget that is paged horizontally.

Advanced security policies are enabled in the system to detect and cease unauthorized access to data, these include techniques such as SSL—secure socket layer, multi factor authentication, fraud classifiers and neural network algorithms to detect and stop unauthorized access.

Sync Channel Administration

The System allows for Sync Channel administrators to create Sync Channel(s), grant and manage access to various Sync Channel(s). Sync Channel administrators can alter member seniority/priority moderate synchronization conflicts. Sync Channel administrators are provided with a web based service as well as a mobile application to access and administer their Sync Channel(s).

Sync Channel Discovery and User Subscription

Users discover Sync Channel(s) from the Server using the Sync Channel Finder service. They can search for Sync Channel(s) based on key words, Sync Channel identifiers, geo location filters, temporal filters, and other custom filters.

Sync Channel Reconciliation Policies

When the device Repository's data differs from the Sync Channel's data, a decision has to be made on which data is more accurate and up-to date. Sync Channel Reconciliation Policies guide this decision making process inside of the system. Both the Sync Channel repository data as well as the user repository data will be subject to update in this and the reconciliation policy(s) setup for the Sync Channel will guide how the Sync Channel gets updated, and the reconciliation policy that the user has chosen for a Sync Channel guides how their data will get updated in this process.

Some of the Sync Channel Reconciliation policies available in the system are described below.

Temporal: The user that updated the data in a temporal order (for example last update wins) is assumed to have most relevant information and hence The Server will reconcile to that information.

Priority Based: In this policy each user is assigned a priority/seniority and the update made from the highest priority user on the Sync Channel is used by the Server to reconcile all slices of data. The system allows for seniority of members to be voted by the group. When there are multiple users of a given seniority, other policies in this list can be applied as tie-breaking criteria (for example when there is a tie, choose the "Simple Majority Opinion"). Ultimately if the tie cannot be broken "User alert policy" will kick in.

Simple Majority Opinion: In this policy the iDataCrunch Server takes the simple majority value for a data item of all data items and reconciles all slices to that value.

Percentage Majority Opinion: In this policy the iDataCrunch Server takes a configured percentage majority and finds if there is commonality in the asked percentage. When not found back up policies can be setup.

User alert policy: In this policy the user is alerted with all the changes in the Sync Channel and the user picks the data item to reconcile to.

Regress to mean: On data items that are numeric this policy will allow for mean value for reconciliation. Variations of the same policy can allow for smoothed values.

Arbitration Policy: In this policy, the synchronization conflicts will be handled by a User designated as the Sync Channel arbitrator.

Custom Computation: In this policy the Sync Channel administrator is provided with a DSL (domain specific language) to setup a custom computation on how the reconciliation needs to happen.

Client Reconciliation policies: In addition to the above mentioned reconciliation policies there is a set of policies that are specific to how clients get updated.

Master reconciliation: In this policy all clients reconcile to the latest master data. This master data is maintained by the Sync Channel Repository as its gets updated.

Sync to stable point: To avoid potential unstable data, the client can choose to reconcile to a stable point setup on the Sync Channel. For example this could be a marker on the Sync Channel that serves the Sync Channel state after the last Sync Channel reconciliation completion.

Location Awareness

Multi-Sync Channel sync is location aware. Custom location based reconciliation policies can be set on Sync Channel (s) to push down intelligence associated with the location. Geo location information is gathered from the devices on which the client runs.

Fine Grained Data

The system is designed to sync fine-grained data. Sync reconciliation algorithm operates on individual data items such as fields in a record.

Figure 2:
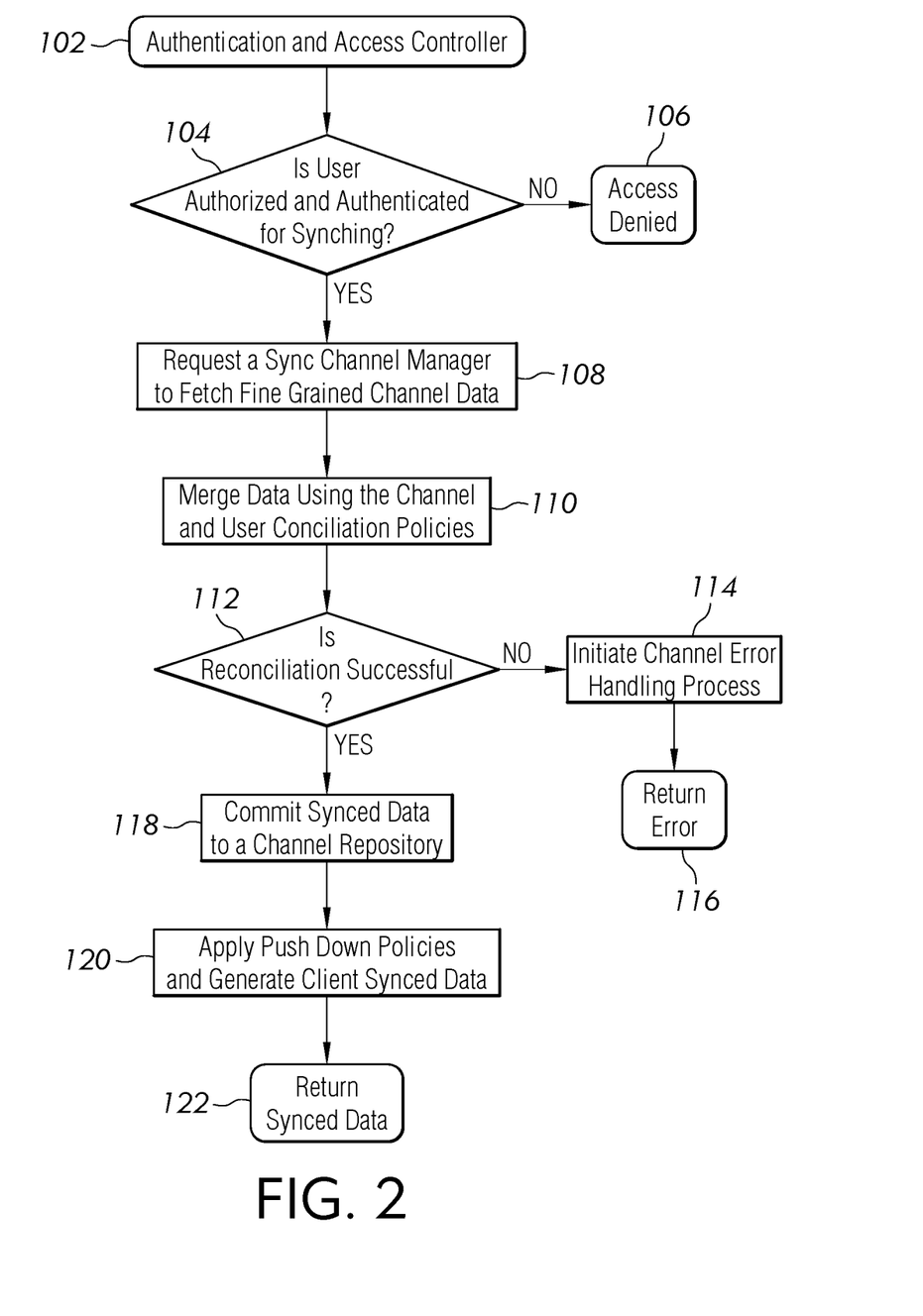
FIG. 2 shows an exemplary sync to point process.

Next, a sync to point process is shown in FIG. 2. The system is designed to sync to predefined points on the Sync Channel. These points are settable by the Sync Channel administrator. Upon entry, the process communicates with an authentication and access controller (102). At 104, the process checks if the user is authorized and authenticated for syncing on a channel, and if not authorized, the process denies access (106). Otherwise the process requests a sync channel manager to fetch fine grained channel data (108). The reconciliation manager merges data using the channel and user conciliation policies (110). Next, the process checks for success in reconciliation (112). If reconciliation is not successful, the process initiates a channel error handling process (114) and returns an error code (116). Otherwise, the reconciliation manager commits synced data to a channel repository (118). Next, an aggregate data controller applies one or more push down policies and generates client synced data (120) and returns the synced data (122).

Figure 3:
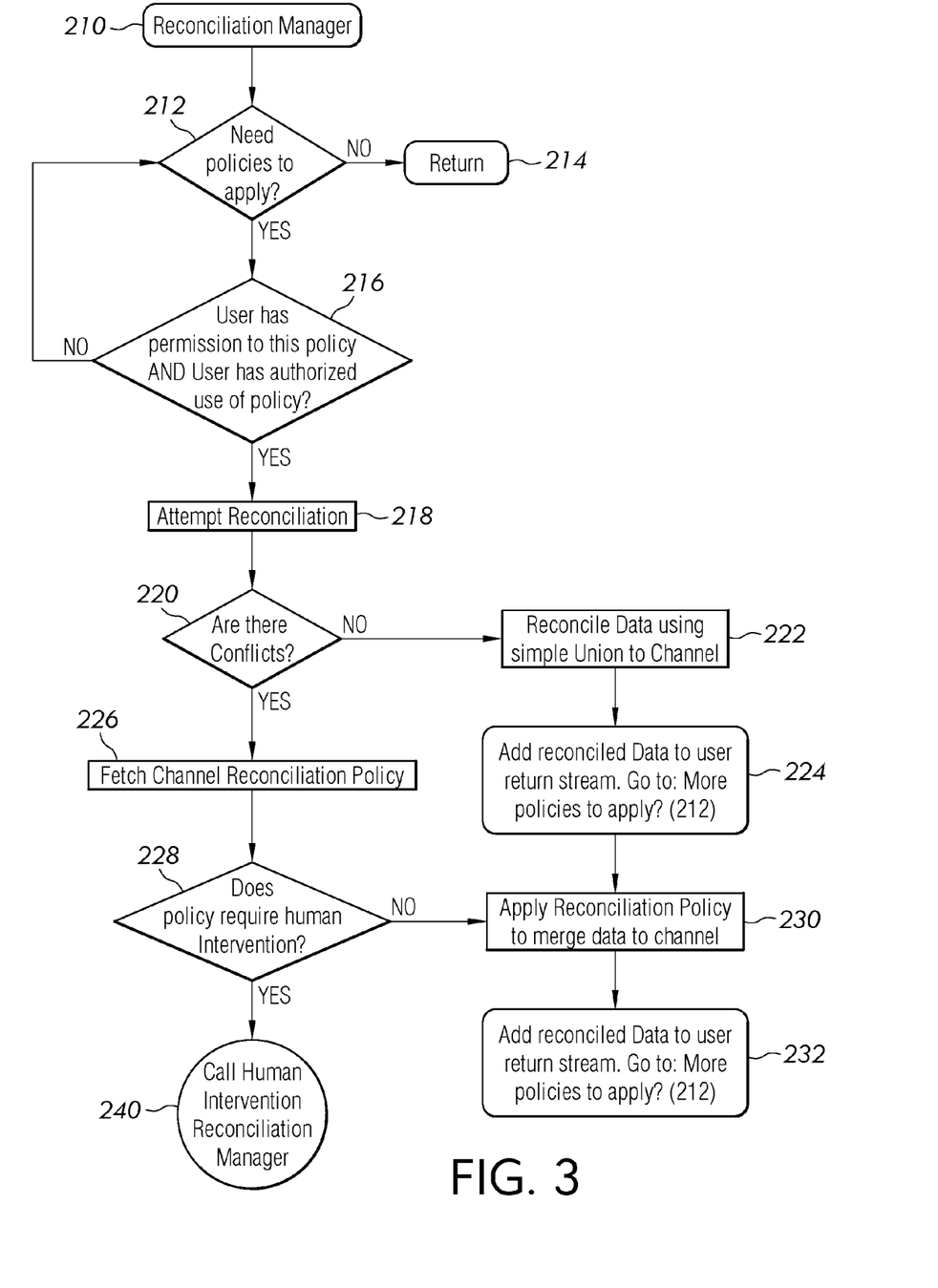
FIG. 3 shows an exemplary reconciliation manager.

Turning now to FIG. 3, the reconciliation manager 230 is detailed. The process checks if all policies have been applied (212). If so, the process exits (214), and otherwise the process checks if the user has permission to the policy and the user has authorized using the policy (216). If not, the process loops back to 212 to process the next policy. If permission is in order the process attempts conciliation (218) and checks for conflicts (220). If no conflict, the process reconciles data using a union to the channel (222). It adds reconciled data to the user's return stream and checks for additional policies to apply (224).

From 220, if a conflict exists, the process fetches a channel reconciliation policy (226) and then checks if the policy requires human intervention (228). If human intervention is needed, the process calls a human intervention reconciliation manager (240), or alternatively, if no human intervention is needed, the process applies reconciliation policy to merge the data to the channel (230). It adds reconciled data to the user's return stream and checks for additional policies to apply (232).

Figure 4:
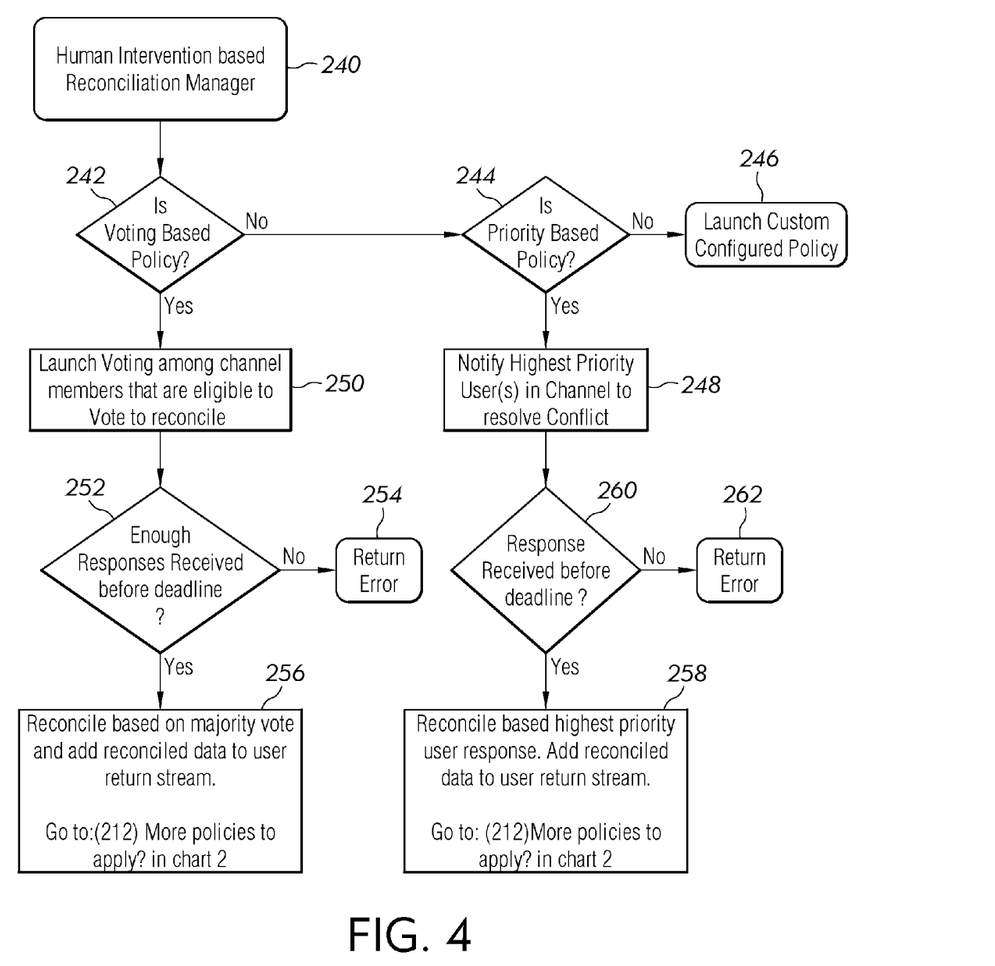
FIG. 4 shows an Intervention based Reconciliation Policy Manager.

FIG. 4 shows in detail a human intervention based reconciliation manager 240. The process checks if the policy is voting based (242) and if not, it checks if the policy is priority based (244). If this is also negative, the process launches a custom configured policy (246) and otherwise notifies the highest priority users in the channel to resolve the conflict (248). The process then determines if a response is received before the deadline. If not the process returns an error (262) and otherwise reconciles data based on the highest priority response. The reconciled data is added to the user return stream and then loops back to apply more policies if needed (264).

From 242, if the policy is voting based, the process of FIG. 4 launches voting among eligible channel members to reconcile the policy (250). The process checks if sufficient responses are received before the deadline (252), and if not returns an error (254) and otherwise reconciles data based on the majority vote. The reconciled data is added to the user return stream and then loops back to apply more policies if needed (256).

Figure 5:
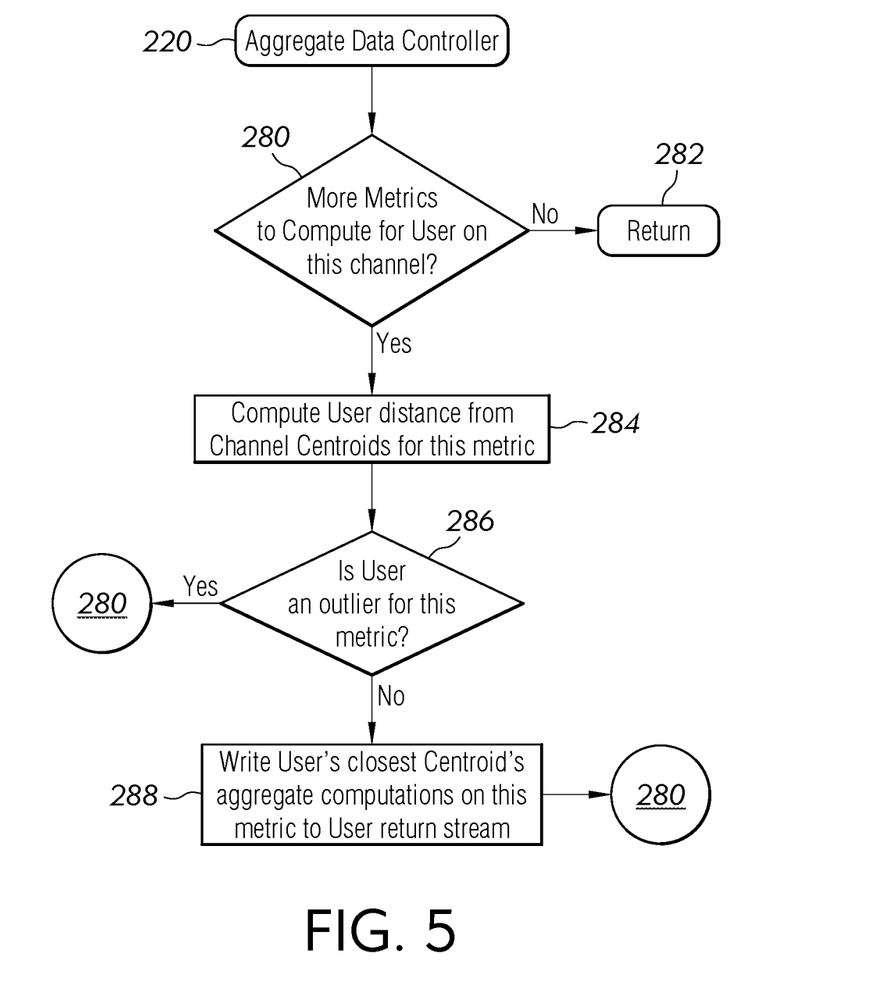
FIG. 5 shows an aggregate data controller process

FIG. 5 shows an aggregate data controller process 220. The process checks if additional metrics are needed for the user on a channel (280). If not the process returns (282) and otherwise the process determines the user distance from the channel centroids for a particular metric (284). The process then checks if the user is an outlier for the metric (286). If yes, the process loops back to 280 and otherwise the process writes the user's closest centroid aggregate computations to the user return stream (288) and then loops back to 280 to check on the next metrics.

Figure 6:
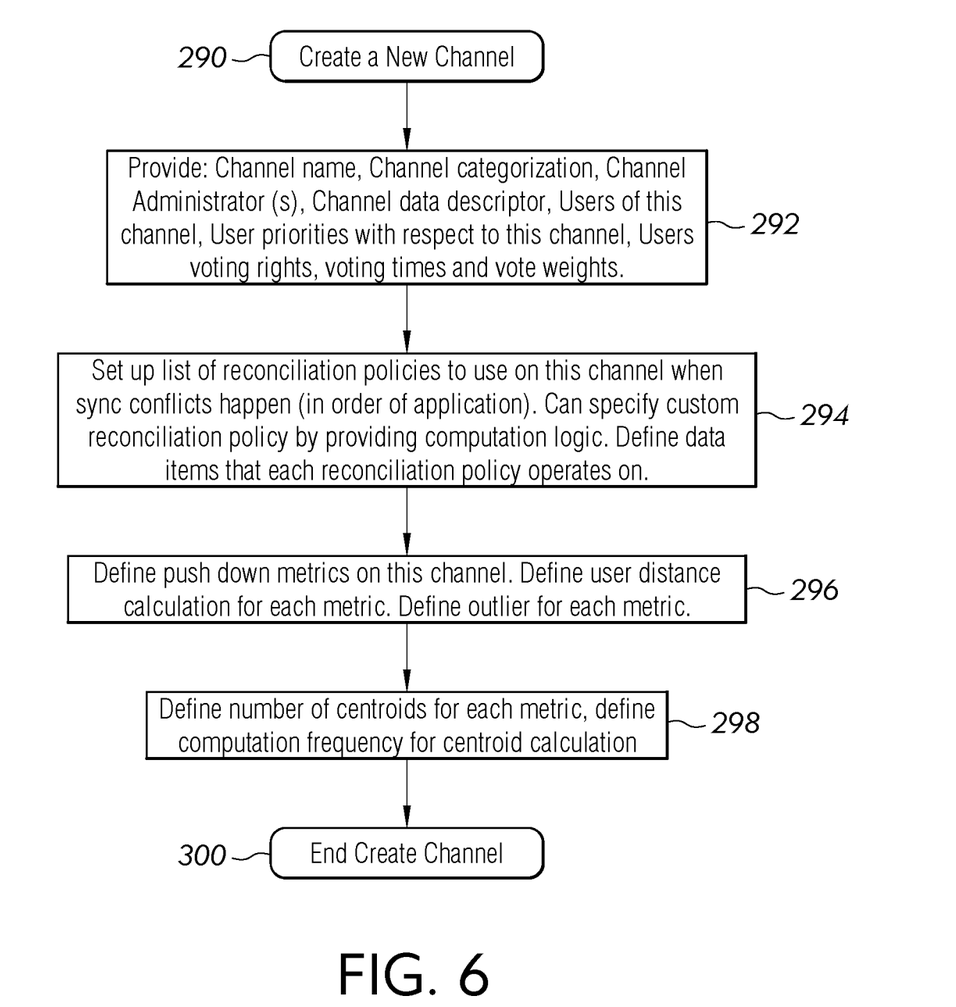
FIG. 6 shows an exemplary new channel creation process.

FIG. 6 shows an exemplary process to create a new channel (290). The process receives a channel name, channel categorization, channel administrators, channel data descriptors, users of the channel, user priorities, user voting rights, voting times and vote weights, among others (292). The process sets up a list of reconciliation policies to use in the channel when sync conflicts occur (294). The user can specify custom reconciliation policy, or define data items that each reconciliation policy operates on, for example. The process then defines push down metrics on this channel and defines user distance calculations for each metric as well as outliers for each metric (296). The process further defines the number of centroids for each metric and defines computation frequency for centroid calculations (298). The create channel process then exits (300).

In one embodiment, the Mobile Client software is made using mobile operating system supported SDK (system development kit), these are available for most major mobile devices such as smart phones from individual vendors. Mobile software has to be crafted to connect to the Server system, perform client side reconciliation as described earlier and, create and store data to the local mobile repository.

The Server system is crafted using web services software development platforms, and several web software development platforms exist and provide features to deploy custom modules that receive and process HTTP/HTTPS requests over the web. Each sub-system described is a module deployed using the web service software development platform. Sync repository is a reliable persistent store such as a database system. Sync Channel(s) are implemented as instances of software objects that are capable of connecting to a data source and bi-directionally transmit data to that source at a high performance.

Typically the Server system is deployed using horizontal scalability deployment techniques in third party data centers that provide high availability and configurability—these data centers and services they provide are also referred to as Cloud Service Providers.

In standard practice all elements are required for functioning of this system. This system can be further enhanced by creating a library of custom reconciliation policies based on specific needs of a Sync Channel. Another improvement on this system would be for the user to have the ability to select and filter aggregate metrics served by the system. Another improvement would be for a user to provide review and feedback upon receiving synced data to another user.

User enters data in their device, uses the iDataCrunch Mobile Client software to find a Sync Channel to interchange their data, they can also create a new Sync Channel. After finding/creating a Sync Channel(s) they can subscribe to it based on the policies setup on the Sync Channel. After subscribing they instantly collaborate with the other users in the Sync Channel, while controlling how their data is published and updated from the Sync Channel. The Sync Channel provides aggregate data down back to the user.

Example 1

For example users in a neighborhood may elect to synchronize their utility bills on a Sync Channel setup in the system. As users synchronize their data, the system gathers this data and computes analytics. Further these computed aggregate analytics may be pushed down to the users from the Server system. An example of such an analytic would be on how a user compares against average energy consumption in that neighborhood and other data clusters they belong to. Further customized analytics maybe pushed to individual users to help them better save on their bills, for example information that a certain service provider offering consistently lower rates in the neighborhood can be pushed down from the cloud to the user. Further customized promotions from a provider can be sent to the user based on data the user agrees to share.

Example 2

In a collaborative business environment several users belonging to a group in a company typically work on planning operations. Such users use the system to subscribe to Sync Channel(s) that serve slices of data that they need from a distributed repository. The users work on their slice of data and reconcile with the distributed repository using the system when they are ready to do so. The system can identify the fine-grained data items that a user has modified and reconcile the data with other users in the Sync Channel that subscribe to this data. The system is capable of handling several user customizable reconciliation policies when to deal with conflicts when same data is updated, as discussed earlier. Further the system pushes down aggregate metrics that help individual users to carry out their business functions more efficiently, in this example an aggregate metric could be—forecast error across all users, this metric could give a user to see if a forecast error they are having is due to their data quality or if it is an issue that is affecting several others in the Sync Channel.

While the above examples illustrate a location aware fine-grained multi-channel synchronization of mobile repositories along with aggregate analytic computation, the system can perform other functions. For example, the system supports one or more of the following:

Mobile software that manages expenses and synchronizes that data with other users.

Mobile software that can produce specific deals by analyzing data and aggregating data across users.

Mobile Enterprise software that helps people in an organization to share and update common set of data.

Web portals that let users share data voluntarily and produce aggregate metrics and information of value to user.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A system for synchronization of mobile devices, comprising:
    a mobile client running mobile client software with a mobile repository which is synchronized by one or more sync channel(s) or logical conduits for information exchange that allow a user to share and reconcile user data with others;
    a sync server accessible over the Internet with services requests from the mobile client software; and
    an Information System (IS) having a distributed database or a message bus coupled to the sync server,
wherein the server translates and relays information to the mobile client repositories while following user setup synchronization policies and one or more Sync Channel administrator setup synchronization policies for location aware fine-grained multi-channel synchronization of mobile repositories along with aggregate analytic computation.

2. The system of claim 1, wherein the mobile client software connects to the server system and performs bi-directional synchronization of user data using advanced reconciliation policies.

3. The system of claim 1, wherein the mobile client carries a slice of the repository at any given time.

4. The system of claim 1, wherein the Mobile client works offline with a slice of data and synchronize at user specified frequency along with a policy to synchronize upon request alone.

5. The system of claim 1, comprising a custom table widget to update and display of graphical and tabular data with gestures on one screen with pagination and sort.

6. The system of claim 1, comprising a custom table widget to provide a custom time series graphical display widget that is paged horizontally.

7. The system of claim 1, wherein a mobile repository contains structured and unstructured information including expenses, inventory snapshots, orders placed, device activity logs, browsing meta data, free text notes, messages.

8. The system of claim 7, wherein the mobile client software allows a user to share data with others and allows others to update the user's data.

9. The system of claim 1, comprising code to gather aggregate information pertaining to users in a selected group that provides additional value to the user.

10. The system of claim 1, comprising code to discover, subscribe to, publish and pull data from one or more Sync Channel(s) that interests the user.

11. The system of claim 1, comprising code, while subscribing to one or more Sync Channel(s) to allow a user to select policies for reconciliation of data published and received through at least one Sync Channel.

12. The system of claim 11, wherein the policies guide the server to update and synchronize a user's mobile repository with the Sync Channel.

13. The system of claim 1, wherein the server allows the reconciliation process to be customized by the user as well as the Sync Channel administrator.

14. The system of claim 1, wherein the server pushes down aggregate metrics and data that are computed by the server to individual users that subscribe to Sync Channel(s).

15. The system of claim 1, comprising code for determining user distance from channel centroids for each metric and aggregating metrics data.

16. The system of claim 1, comprising code for selecting from a list of reconciliation policies on a selected channel, defining push down metrics, user distance and outlier for each metric, and defining a number of centroids and frequency of centroid determination for each metric.

17. The system of claim 1, comprising one or more Sync Channel Reconciliation policies with Temporal, Priority Based, Simple Majority Opinion, Percentage Majority Opinion, User alert policy, Regress to mean, Arbitration Policy, Custom Computation, Client Reconciliation policies, Master reconciliation, and Sync to stable point policies.

18. A method for synchronization of mobile devices, comprising:
    synchronizing a mobile repository on a mobile client running a mobile client software with one or more sync channel(s) or logical conduits for information exchange that allow a user to share and reconcile user data with others;
    accessing a sync server over the Internet and services requests from the mobile client software;
    storing sync server data in an Information System (IS) having a distributed database or a message bus coupled to the sync server; and
    translating and relaying information to the mobile client repository while following one or more user setup synchronization policies and one or more Sync Channel administrator setup synchronization policies for location aware fine-grained multi-channel synchronization of mobile repositories along with aggregate analytic computation.

19. The method of claim 18, comprising allowing a reconciliation process to be customized by the user as well as the Sync Channel administrator.

20. The method of claim 18, comprising pushing down aggregate metrics and data that are computed by the server to individual users that subscribe to Sync Channel(s).

* * * * *